June 29, 1954 G. C. WYMAN 2,682,279
PRESSURE VESSEL WITH LOADED RELIEF VALVE
Filed May 16, 1949 3 Sheets-Sheet 1
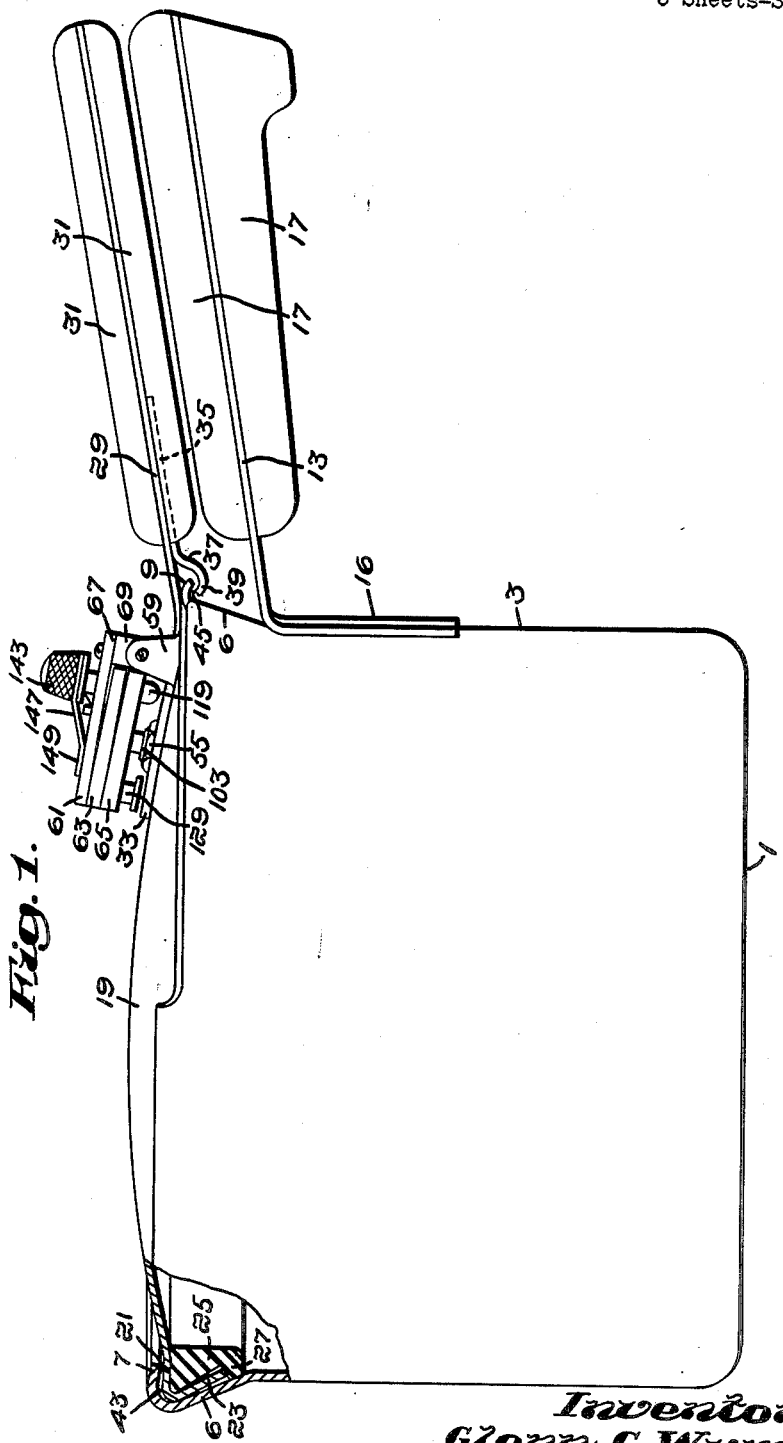

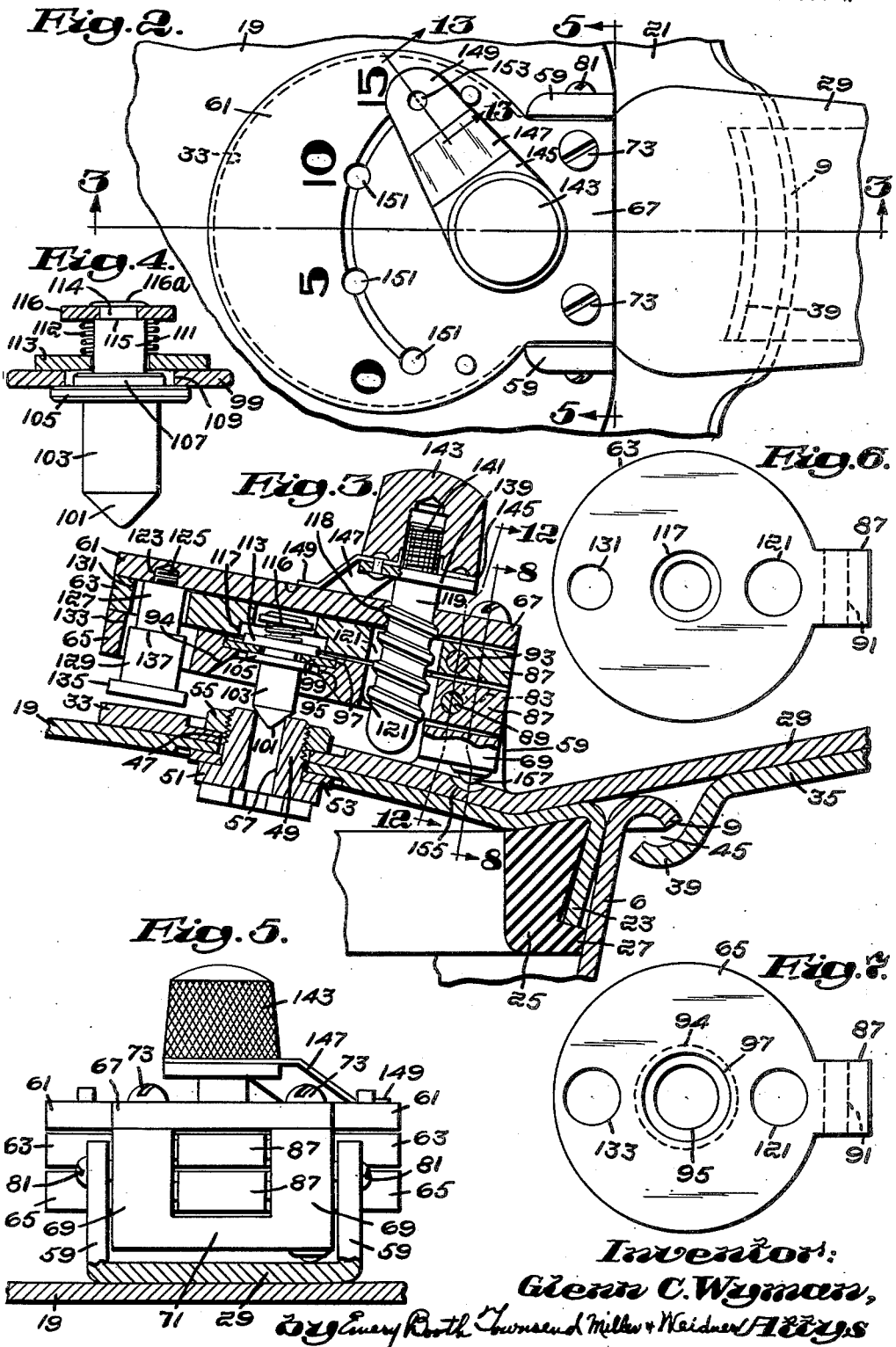

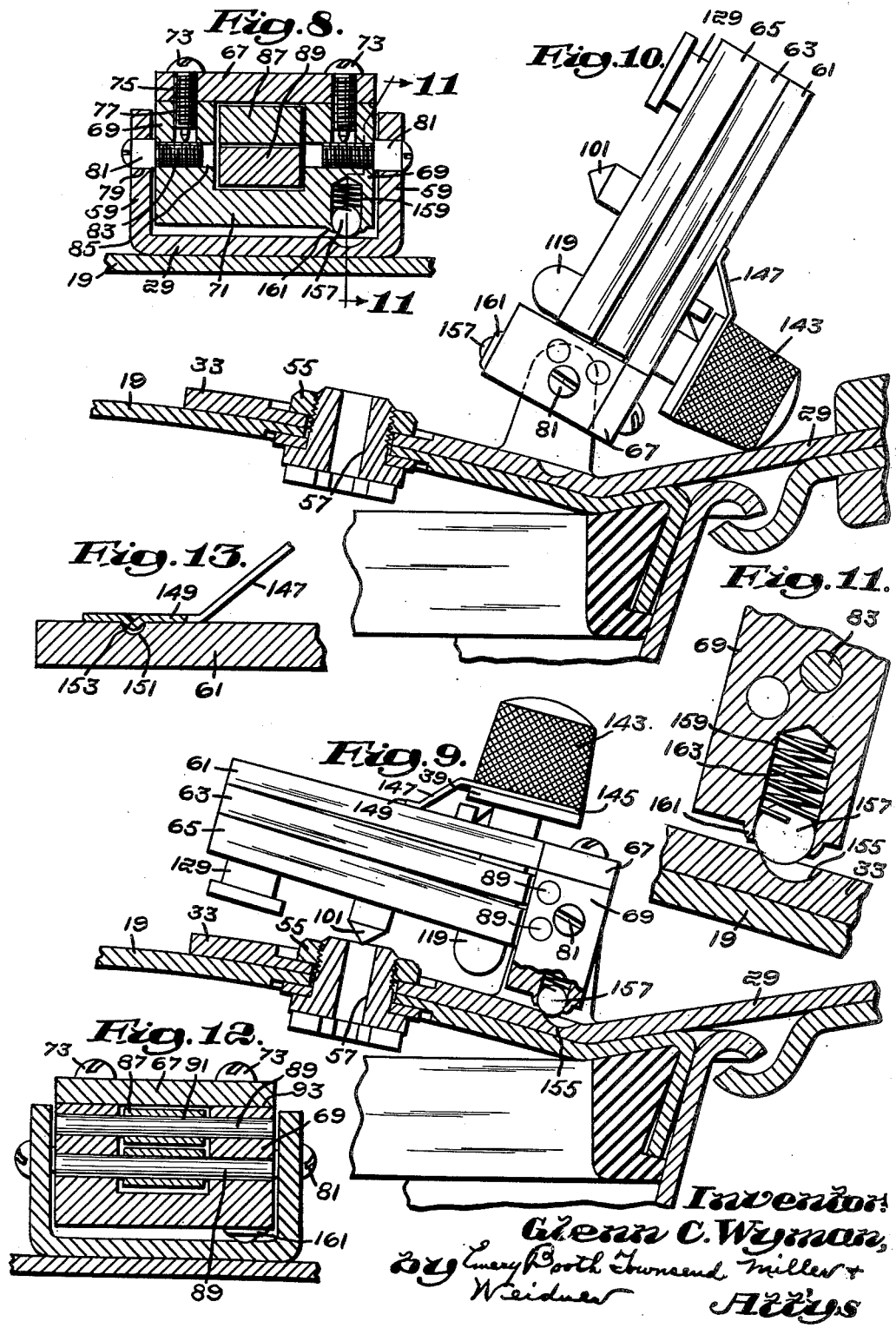

Patented June 29, 1954

2,682,279

UNITED STATES PATENT OFFICE 2,682,279

PRESSURE VESSEL WITH LOADED
RELIEF VALVE

Glenn C. Wyman, Rome, N. Y., assignor to Revere
Copper and Brass Incorporated, Rome, N. Y.,
a corporation of Maryland Application May 16, 1949, Serial No. 93,578

11 Claims. (Cl. 137—470)

My invention relates to relief valves for pressure cookers.

The invention has among its objects improved means for controlling and selectively regulating the pressure within the pressure cooker and for signaling to the operator the existence in the cooker of the pressure to be maintained therein.

The above and other objects of the invention will be best understood from the following description when read in the light of the accompanying drawings of a specific embodiment of the invention selected for illustrative purposes, while the scope of the invention will be more particularly pointed out in the appended claims.

In the drawings:

Fig. 1 is a front elevation of a pressure cooker according to the invention, with parts in section;

Fig. 2 is a plan of a fragment of the pressure cooker according to Fig. 1, on an enlarged scale;

Fig. 3 is a section on the line 3—3 of Fig. 2, with parts in elevation;

Fig. 4 illustrates a detail;

Fig. 5 is a section on the line 5—5 of Fig. 2;

Fig. 6 is a plan of the intermediate weight for controlling the pressure relief valve;

Fig. 7 is a plan of the lowermost weight for controlling the pressure relief valve;

Fig. 8 is a section on the line 8—8 of Fig. 3;

Figs. 9 and 10 are, respectively, sections on the line 3—3 of Fig. 2 with parts in elevation, each corresponding to Fig. 3 with parts in a different operative position;

Fig. 11 shows a detail of Fig. 9 on an enlarged scale, and corresponds to a section on the line 11—11 of Fig. 8 with parts in a different operative position;

Fig. 12 is a section on the line 12—12 of Fig. 3; and

Fig. 13 is a section on the line 13—13 of Fig. 2.

Aside from the pressure controlling mechanism, the pressure cooker illustrated is generally like those shown by co-pending applications of William A. Welden Serial Number 677,043, filed June 15, 1946, now Patent No. 2,614,723, dated October 21, 1952, and Serial Number 695,128, filed September 6, 1946, now Patent No. 2,614,725, dated October 21, 1952, while the pressure controlling mechanism is generally like those shown by applicant's co-pending application Serial Number 26,862, filed May 13, 1948, now Patent No. 2,614,724, dated October 21, 1952, and co-pending application of Roland T. Spencer, Serial Number 50,583, filed September 22, 1948, now Patent No. 2,649,774, dated August 25, 1953, the present invention constituting an improvement in the latter.

As illustrated, the pressure cooker comprises a container, preferably formed of sheet metal such as stainless steel, having a bottom wall 1 and cylindrical side walls 3. Adjacent their upper edges the side walls are formed to present an outwardly flared frusto-conical portion 6 extending entirely about said walls. At its upper edge this frusto-conical portion is formed to present a narrow inwardly turned lip 7 extending about said portion for approximately 180°. At the side of the frusto-conical portion diametrically opposite the lip 7 said portion is formed with a narrow outwardly projecting downwardly turned lip 9 of shorter angular extent than the lip 7. Carried by the container is a radially projecting handle 13 having a base portion 16 secured to the cylindrical walls of the container, preferably by welding, this handle being provided with the handle grips 17.

As shown, the cover, which also is formed of sheet metal, preferably stainless steel, is shaped to present a dome-like central portion 19 surrounded by a flattened relatively narrow annular flange 21. Integral with the outer peripheral edge of this flange is an inwardly turned downwardly extending frusto-conical flange 23 extending entirely about the cover. Carried by the cover at its under side is a gasket ring 25 of greater height than the flange 23, this ring being formed of flexible resilient material such as synthetic rubber, and being shaped to fit into the space between the flanges 21 and 23 and to provide a lower portion 27 which projects radially beyond the outer side of the flange 23 at its lower edge so as to bear uninterruptedly against the inner wall of the frusto-conical portion 6 of the container when the cover is assembled with the latter.

As shown, the cover is provided with a radially projecting handle 29 provided with the handle grips 31. This handle is provided with a base portion 33 which and the adjacent portion of the body of the handle conform to the upper sides of the dome-shaped portion 19 and annular flange 21 of the cover to which they are secured preferably by welding. Secured to the under side of the handle 29, also preferably by welding, is the base 35 of a strip-like member which, at its end adjacent the cover, is provided with a downturned portion 37, which latter, at its lower end, is upwardly turned to form a hook 39.

When the parts are in the position shown by the drawings the cover is removably retained on the container by the container lip 7 positioned above the cover flange 21 and by the container lip 9 positioned above the cover hook 39. When the cover is initially placed on the container a clearance 43 exists between the container lip 7 and cover flange 21, and an equal clearance 45 between the container lip 9 and cover hook 39, the projecting portion 27 of the gasket ring 25 bearing against the frusto-conical container portion 6 so as to seal the joint between the cover and container and thus permit pressure to build up in the cooker. When the pressure builds up, the cover rises to take up the clearances 43 and 45, the gasket ring, because of its resiliency and the pressure within the cooker, remaining in contact with the frusto-conical container portion 6 so that at all times the gasket renders the joint between the cover and the container steam-tight in respect to positive pressure within the cooker.

As shown, the base portion 33 of the handle 29, and the cover portion 19 immediately below said base portion, are jointly formed to provide a perforation 47 (Fig. 3) through which extends the shank portion 49 of a removable plug having a head 51 below the cover. Surrounding the shank, and positioned between the head and the under side of the cover, is a compressible gasket washer 53. The upper projecting end of the plug is screw-threaded, and is received in a nut 55 resting against the upper side of the base portion 33 of the handle 29. This nut serves to secure the plug in assembled relation with the other parts and to compress the gasket washer 53 for rendering the joint between the plug and the cover fluid-tight. The plug is further provided with a longitudinal through bore 57 serving as a vent passage for the cooker.

As illustrated, the handle 29 adjacent its base portion 33 is struck up at opposite sides to form upwardly projecting ears 59 (Figs. 1, 3, 5 and 8). Carried by these ears above the bore or vent passage 57 are shown an upper weight 61, an intermediate weight 63 and a lower weight 65.

The upper weight 61 has a disk-like body portion formed with a lateral projection 67 at the under side of which is carried a U-shaped member positioned between the ears 59. This U-shaped member comprises the opposite vertical legs 69 integrally connected to each other at their lower ends by a base portion 71. These legs at their upper ends abut the under side of the projection 67 and are rigidly secured thereto by the screws 73 which extend through perforations 75 (Fig. 8) in the projection and are screw-threaded into the perforations 77 in the legs. For pivotally supporting the upper weight 61 on the ears 59 the latter are provided with perforations 79 which rotatably receive the cylindrical heads 81 of screws having shanks 83 screw-threadedly received in perforations 85 formed in the legs 69.

The intermediate weight 63 comprises a disk-like body portion having a laterally projecting portion 87 (Fig. 6) which is received between the legs 69 of the U-shaped member 69, 71. The intermediate weight 63 is mounted for swinging movement on a pin 89 which extends through a perforation 91 (Fig. 12) in the projecting portion 87 of said weight, the pin at its opposite end portions being received by and having a driving fit in the perforations 93 in the legs 69 of the U-shaped member 69, 71 carrried by the upper weight 61.

The lower weight 65, like the intermediate weight 63, is also provided with a laterally projecting portion 87 (Fig. 7) received between the legs 69 of the U-shaped member 69, 71 carried by the upper weight 61. In a like manner the lower weight 65 is mounted on this U-shaped member for swinging movement by a second pin 89.

The lower weight 65 is shown as formed on its under side with a cavity 94 (Fig. 3), preferably having downwardly flared lateral walls. Into this cavity axially thereof opens a perforation 95, this perforation at its upper end being formed with an enlarged diameter portion 97 providing a shallow recess for receiving a washer-like member 99 having a press fit therein so as to be fixedly secured to the weight. Carried by this washer-like member is a conical valve 101 which, when the parts are in their position shown by Fig. 3, seats on a valve seat presented by the upper peripheral edge of the vent passage or bore 57. The upwardly projecting cylindrical stem or shank 103 of this valve is integrally formed intermediate its length with a radially extending annular flange 105 which seats on the under side of the washer-like member 99 for urging the valve against its seat when the parts are in their position shown by Fig. 3. Above the flange 105 the stem or shank 103 is formed with a cylindrical reduced diameter portion 107 (Fig. 4) which is received in the central circular opening 109 of the washer-like member with sufficient lateral clearance between the parts to permit lateral sliding of the stem 103 in all radial directions relative to the washer-like member. Above this reduced diameter portion 107 the stem or shank is formed with a further reduced diameter portion 111 (Fig. 4), which latter portion carries a washer 113, this washer being pressed against the upper side of the washer-like member 99 by a light spring 112 surrounding the reduced diameter portion 111. At its upper end the stem is still further reduced in diameter, as shown at 114, to form an annular shoulder 115. On this reduced diameter portion 114 and bearing against the shoulder 115 is a washer 116 fixedly secured to the stem 103 by riveting over the projecting upper end portion of said stem as shown at 116ª. This washer 116 serves as an upper abutment for the spring 112, which latter causes the washer-like member 99 to be frictionally gripped between the washer 113 and the annular flange 105 in all positions of the weights. As shown, the intermediate weight 63 is formed with a perforation 117 for receiving the upper portion of the stem 103 and parts carried thereby.

The lateral lost motion between the valve stem 103 and the washer-like member 99, and the frictional grip above described of the parts with that member, permit the valve to move laterally relative to the lower weight 65 so that the valve will accurately seat on the valve seat, and, when moved to a position relative to the weight on which it will so seat, to remain in such relative position when the valve opens and closes to control the pressure generated within the cooker.

As further shown, the upper weight 61 is formed with a screw-threaded opening 118 (Fig. 3) through which is screw-threaded a screw 119, the screw freely passing downward through aligned openings 121 in the intermediate weight 63 and lower weight 65. By turning the screw its lower end may be brought into engagement with the upper surface of the base portion 33 of the handle 29 for swinging the upper weight 61 about its pivotal connection to the ears 59 for raising it relative to the pressure cooker cover.

At the side of the pressure relief valve 101 opposite the screw 119 the upper weight 61 is formed with a screw-threaded perforation 123 into which is fixedly screw-threaded a downwardly projecting pin 125. This pin is formed with progressively enlarged diameter portions 127 and 129, the portion 127 extending through an opening 131 in the intermediate weight 63 and the portion 129 extending through an opening 133 in the lower weight 65. At its lower end the pin is formed with a head 135 positioned below the lower weight 65. The enlarged diameter portion 129 of the pin forms with the smaller diameter portion 127 thereof an annular shoulder 137 of greater diameter than the diameter of the opening 131 in the intermediate weight 63, while the head 135 of the pin is of greater diameter than the diameter of the opening 133 in the lower weight 65.

The screw 119 at its upper end projects above the upper weight 61. This projecting portion of the screw is integrally formed with a collar 139. The portion 141 of the screw above this collar is screw-threaded, on which screw-threaded portion is fixedly screwed a knob 143 for turning the screw. Clamped against the collar 139 by the knob is the base portion 145 of a spring arm 147 the outer end portion 149 of which extends over the upper surface of the upper weight 61. On its upper surface the upper weight 61 is formed with spaced recesses 151, while the end portion 149 of the spring arm is struck up to form a downwardly extending tapering projection 153 (Figs. 2 and 13) adapted to snap into and be resiliently received in these recesses when moved into registry therewith and to cam out of the recesses when the spring arm is urged to rotate by the operator turning the knob 143.

The recesses 151 in the upper weight 61 serve to locate the screw 119 in different rotative positions relative to the weight. When the spring arm is in its position shown by Fig. 2 the screw will be in its position shown by Fig. 3, under which conditions all three weights act upon the valve to hold it against its seat until a predetermined pressure, say 15 pounds per square inch, is reached in the cooker, whereupon the steam pressure acting on the valve will overcome the downward force of the weights and lift the valve from its seat. If the screw is turned by the knob 143 to the position indicated by the ordinal 10 of Fig. 2 the screw will move downward relative to the upper weight 61 to contact the base portion 33 of the cover handle 29 and lift that weight slightly so that only the two lowermost weights 63 and 65 will operate on the valve, under which conditions a pressure of say 10 pounds per square inch will be maintained in the cooker. If the screw is turned to move the spring arm to the position indicated by the ordinal 5 of Fig. 2 the upper weight 61 will be raised still higher and the shoulder 137 on the pin 125 will engage the under side of the intermediate weight 63 to lift it also, under which conditions only the lower weight 65 will be effective to operate upon the valve for maintaining a still lower pressure in the cooker, say 5 pounds per square inch. Further rotation of the screw to move the spring arm to its position indicated by the ordinal 0 in Fig. 2 will cause further lifting of the weights 61 and 63, and cause the head 135 of the pin 125 to engage the under side of the lower weight 65 to lift that weight also and with it the valve so that the valve will not be seated and no pressure will be maintained in the pressure cooker.

It has been found that when, through carelessness or otherwise, enough heat is applied to the pressure cooker to heat its contents with undue rapidity the pressure in the cooker, when it reaches such value as will overcome the downward force of the selected weight or weights controlling the relief valve, tends to throw the weights and valve voilently upward into their positions illustrated by Fig. 10, causing a jet of steam to be ejected with considerable force from the vent passage 57, which is liable to scald the operator. This tendency is most pronounced when all the weights act on the valve for maintaining the maximum possible pressure in the cooker. Normally when the lowermost weight only, or that weight and the intermediate weight only, are selected for controlling the valve, the weights or weight above such selected weight will resist any tendency of the valve to be thrown to its position shown by Fig. 10. For preventing such throwing of the valve to its position shown by Fig. 10 the base portion 33 of the cover handle, as shown, is formed with a recess 155 which under normal conditions of operation loosely receives a ball 157 carried by, and projecting from the under side of, the U-shaped member 69, 71 carried by the upper weight 61. This ball is shown as received in a bore 159 (Fig. 11) in which it is retained by the flange 161 of lip-shaped cross-section at the underside of the U-shaped member, the ball being yieldingly pressed outward by the compression spring 163 within said bore. The recess 155 is of such dimensions relative to those of the ball that when the parts are in the position shown by Fig. 3, and heat is applied to the cooker at a normal rate, the weights and parts carried thereby may swing about their pivotal supports for controlling the valve for maintaining the desired maximum pressure within the cooker. However, if heat is applied to the cooker at such an unduly rapid rate as to tend to throw the parts to their positions shown by Fig. 10 when the valve opens, the parts nevertheless will be prevented from being thrown beyond their positions indicated by Fig. 11 by reason of the ball when moved to this latter position engaging the edge of the recess, and when in their positions indicated by Fig. 11 the weights will act as a shield in respect to upwardly directed steam issuing from said vent passage to prevent scalding of the operator. It is desirable, however, for the operator to move the parts into the position shown by Fig. 10 when initially applying heat to the cooker so as to vent it of air, complete venting of the cooker in this respect being indicated by steam beginning to issue through the vent passage 57. This issuance of steam could not be readily observed if the parts were in their position shown by Fig. 3. Therefore the spring 163 is of such strength as to cause the ball 157 to yield for permitting it to be cammed out of the recess 155 when the operator forcibly moves the valve from its position shown by Fig. 3 to its position shown by Fig. 10.

It will be understood from the above that in the normal operation of a pressure cooker provided with a weighted pressure relief valve requisite heat is applied to the cooker to cause the pressure therein to build up at such rate that when the downward force of the weight on the valve is overcome the valve will very slightly open to permit escape of steam from the cooker and thus prevent further increase in the pressure. When such steam is observed to escape the operator will, if necessary, reduce the amount of heat being applied to the cooker so as to reduce the amount of escaping steam to a minimum so as to conserve the amount of water in the cooker.

In respect to the cooker herein described, it has been found that if the cavity 94 is omitted, for example if the bottom surface of the lower weight 65 is flat throughout its entire extent, the steam escaping from the vent opening and passing radially beneath the weight through the space between it and the top of the cover constituted by the handle base 33 tends to create a partial vacuum in such space adjacent the under surface of the weight. This the steam apparently does because of its expansion and partial condensation in such space and because it passes through such space in the form of a more or less flat jet and therefore apparently acts as an ejector for exhausing air and vapors in the space. As a result of this partial vacuum, created when the cavity 94 is omitted, the steam pressure in the cooker necessary to cause the valve to remain continuously slightly open must be somewhat higher than that determined by the transverse cross-sectional area of the vent passage 57 or valve 101 and the downward gravitational force on the valve exerted by the weight or weights which control the valve, because the steam pressure must under such conditions be such as will overcome not only the downward gravitational force of the weights but the downward force on the weights resulting from this partial vacuum, the valve, and weight or weights which control it, under these conditions being substantially balanced by the upward force of the steam issuing through the valve seat so that the valve and weights in effect float on the steam or vapors beneath the lower weight 65. Because the degree of this partial vacuum created beneath the weight 65 is determined by the rate of escape of steam from the vent passage, which in turn is determined by the rate at which heat is applied to the cooker, and the last mentioned rate is variable and cannot be determined in advance, it is impossible to determine accurately the cooker pressure which will cause the above mentioned floating or balancing of the weights and valve when the cavity 94 is omitted, say for example when the under surface of the lower weight is substantially flat throughout its entire extent, and this in practice often results in error in the actual pressure maintained in the cooker in respect to the pressure intended to be maintained therein, this error in some cases amounting to several pounds per square inch when it is intended to maintain a pressure of 15 pounds per square inch within the cooker.

It has been found that possibility of the above mentioned error may be eliminated by providing the under surface of the lower weight 65 with the chamber or cavity 94, which latter, as shown, is circular and coaxial with the valve stem 103, the conical side walls of the valve if projected upward intersecting the cavity within the confines of its opening on the under surface of the weight. The reason the cavity does this is apparently because when the pressure within the cooker first opens the valve an upwardly directed inverted conical sheet of steam is projected upward into the cavity, making it necessary to fill the cavity with steam before steam can escape therefrom for passage radially outward between the lower weight and pressure cooker cover and create a partial vacuum beneath the weight. This delay in creating the partial vacuum apparently causes the weight and valve to lift a somewhat greater distance than were the cavity omitted, with the result that it causes the escape of an increased amount of steam which tends momentarily to reduce the pressure in the cooker more than if the cavity were omitted, and which, as soon as the cavity is filled with steam, almost instantly creates a partial vacuum beneath the weight, such partial vacuum being higher than were the cavity omitted, and causing the weight or weights employed sharply to descend from their raised position to close the valve. When the valve is so closed the partial vacuum is destroyed and the valve immediately again opens to repeat the described cycle of operations. As these cycles are repeated very rapidly, say at the rate of 100 to 200 times per minute, the steam in effect escapes from the cooker in rapidly recreated puffs without the existence of a continuous partial vacuum beneath the lower weight, which, coupled with the fact that the valve, when it opens, opens wider and thus momentarily tends to secure a greater release of pressure than were the cavity omitted, results in the cavity securing the net result of causing the pressure maintained within the cooker to be substantially that determined by the gravitational force of the weight or weights acting on the valve and transverse cross-sectional area of the vent passage or valve independently of the rate at which heat is applied to the cooker.

A further result secured by the cavity 94 is that it causes the valve to signal audibly to the operator the fact that the pressure in the cooker has reached the desired maximum, so that the heat applied to the cooker may be reduced, if necessary, as above explained, and to indicate that the cooking of the food under the desired pressure has commenced. This signal is apparently caused for the most part by the above explained sharp closure of the valve, the impact of the valve on its seat when it closes making a noise which, because such closure of the valve is very rapidly repeated, results in what may be described as a buzzing or chattering sound comparable in volume to that produced by the ordinary electric buzzer but of a somewhat lower pitch. Within limits the pitch, however, may be varied by varying the volume of the cavity 94, the greater such volume the lower the pitch. Coupled with this sound is the sound of the rapidly repeated puffs of escaping steam. Commonly, and particularly when heat is applied to the cooker at a moderate rate, the signal is not continuous, but occurs for several seconds, then ceases for a second or so, and then repeats itself, this so interrupted signal occurring continuously until the heat applied to the cooker is reduced by the operator.

It is found that the frictional grip of the parts supporting the valve stem on the washer-like member 99 acts to insure the above described buzzing or chattering of the valve, when it is mounted for swinging movement as described. Were the valve mounted for free lateral movement on this washer-like member it would tend to be forced sidewise by the steam escaping from the vent passage 57 when the valve is open, this being particularly likely to occur when the valve is almost closed. So forcing the valve sidewise relative to the washer-like member would not permit the valve to close properly when the cooker is under working pressure. In this connection it will be observed that, under normal conditions when the valve automatically opens, said valve and the weights tend in effect to float on the escaping steam so that there is but little resultant gravitational force tending to close the valve. Also it will be observed that in the construction described the valve opens and closes by swinging in an arc which tends to present when the valve is off its seat a greater area at the right hand side of the valve, as viewed in Fig. 3, exposed to the escaping jet of steam than at the left hand side of the valve, and that this tends to slide the valve sidewise toward the left as so viewed; the valve in the ordinary domestic cooker being of light weight and being shown in Fig. 3 about twice its actual size as used in practice in such a cooker. The parts, however, are so designed that the frictional grip of the parts on the washer-like member 99, although light enough to permit the valve to so position itself relative to said member as to seat properly when the valve is initially closed at the start of operations to permit pressure to build up in the cooker, is yet great enough to prevent the valve from being moved sidewise by the escaping jet of steam.

The exact shape of the cavity 94 and the dimensions necessary to secure the above effects produced by the cavity are not critical. Satisfactory results are secured, for example, with a lower weight 65, effective to maintain a pressure of 5 pounds per square inch within the cooker, having a body portion 1.6 inches in diameter formed with a cavity 94 having a vertical depth of 0.09 inch and an opening on the lower surface of the weight of 0.6 inch diameter, the vent passage 57 having a diameter of 0.14 inch and the valve stem 103 a diameter of 0.17 inch, the conical sides of the valve being at an angle of 45 degrees to the valve axis, and the under surface of the weight adjacent the valve being spaced from the upper surface of the handle base portion 33 about 0.28 inch. Other proportions and shapes of parts will give satisfactory results, so long as the cavity or chamber 94 is of sufficient volume to delay momentarily the creation of a partial vacuum beneath the weight 65 when the valve opens, and the steam is caused to travel from the cavity toward the periphery of the weight along paths close enough to the under surface of the weight to create a partial vacuum adjacent that surface.

It will be understood that the above matter respecting the theory of operation of the device having the cavity 94 is advanced as applicant's explanation as to why there are secured the results observed when the cavity is present and when it is omitted. Despite any possible inaccuracy in this theory, it nevertheless is true that the presence of the cavity secures those results and that such results are not secured when it is omitted.

It will be also understood that within the scope of the appended claims wide deviations may be made from the form of the invention described without departing from the spirit of the invention.

I claim:

1. A pressure vessel having a vent passage and an associated valve seat, a weight swingable about a horizontal axis carrying a valve having a downwardly projecting tapered surface for cooperation with said valve seat for controlling the pressure of the steam generated within the vessel, means forming a lost motion connection between the valve and weight for permitting the valve to move laterally relative to the weight and center itself with said valve seat when the valve is closed and the vessel is not under pressure, means for frictionally retaining the valve in its so centered position when the valve is thereafter opened and closed, the means forming such lost motion connection and for so frictionally retaining said valve comprising a stem for the valve and means operatively presented by the weight forming oppositely facing flat surfaces connected by an opening through which latter said stem laterally loosely extends, the stem carrying a collar which is fixed against movement longitudinally thereof and bears against one of said surfaces, and also carrying a second collar which is movable longitudinally thereof and bears against the other of said surfaces, the stem further carrying a compression spring for pressing the last mentioned collar against the last mentioned surface whereby the means presenting said surfaces is frictionally gripped between the two collars.

2. A pressure vessel provided with a vent opening; a vent valve for said opening; a weight for urging said valve into closed position against the pressure within the vessel acting on the valve to open it for maintaining a predetermined pressure within the vessel, which weight has a surface portion adapted to act as a shield in respect to pressure fluid discharged through said opening when pressure within the vessel opens said valve against the closing force of the weight; means operatively mounting said weight on said vessel at one side of said opening for swinging in a vertical plane into a first position in which said weight is operative to urge the valve into closed position and said surface portion is in opposed spaced relation to said opening for acting as such shield and into a second position in which said weight is inoperative to so urge the valve and said surface portion is in unopposed relation to said opening so as not to act as such shield; a detent and stop, one of which is operatively carried by said vessel and the other of which is operatively carried by said weight, the detent being constituted by a part presenting a rounded head adapted to be received in a recess, a lateral wall of which recess constitutes the stop, a spring acting on said part for urging it into said recess when aligned therewith, the head being of sufficient size that when received by the recess it permits limited swinging of the weight when in its first position, said lateral wall of the recess being so shaped as to cooperate with said rounded head to cam said head out of said recess when said weight is manually urged to swing from its first position to its second position.

3. A pressure vessel according to claim 2 in which the detent is constituted by a spring pressed ball carried by the weight and having a portion projecting therefrom, the stop being constituted by the wall of a recess in which such projecting portion of the ball is adapted to be received, the ball being of such size that when so received it permits the limited swinging of the weight when in its first position, surfaces of said recess being so shaped as to cam said ball out of the recess when said weight is manually urged to swing from its first to its second position.

4. A pressure vessel according to claim 2 in which the vent opening is directed upwardly for discharging the pressure fluid upwardly and the valve is carried by the weight at its under side, which side is adapted to act as the shield.

5. A pressure vessel according to claim 2 in which the weight and its mounting are so arranged that the center of gravity of the weight lies at the same side of the axis of swinging of the weight as the vent opening when the valve is in its first position and lies at the opposite side of said axis when in its second position.

6. A pressure vessel according to claim 2 in which the vent opening is directed upwardly for discharging the pressure fluid upwardly and the valve is carried by the weight at its under side, which side is adapted to act as the shield, the weight and its mounting being so arranged that the center of gravity of the weight lies at the same side of the axis of swinging of the weight as the vent opening when the valve is in its first position and lying at the opposite side of said axis when in its second position.

7. A pressure vessel provided with an upwardly directed vent opening, a control valve for said vent opening adapted to be urged toward open position by the pressure within the vessel, a weight for urging said valve toward closed position, which weight is positioned above said vent opening to act as a shield in respect to upwardly directed pressure fluid discharged from said opening, the weight comprising an upper weight part having adjacent one lateral side thereof a downwardly projecting portion extending to adjacent the upper surface of the vessel at one side of the vent opening, means pivotally connecting said downwardly projecting portion to the vessel for swinging of said upper weight part about a horizontal axis at the same side of the vent opening as said portion, said weight also comprising a second weight part situated below said upper weight part in position to support the latter, said second weight part having a portion pivotally connected to said downwardly projecting portion of said upper weight part for relative swinging about a horizontal axis relative to said upper weight part, a manually adjustable part carried by the upper weight part having a position of adjustment relative to said upper weight part in which it contacts the vessel for causing the latter to support said upper weight part whereby to cause only said second weight part to control the valve, said manually adjustable part having another position of adjustment relative to said upper weight part in which it is out of contact with the vessel for causing said upper weight part to be supported by said lower weight part whereby to cause both weight parts conjointly to control the valve, the downwardly projecting portion of the upper weight part carrying a spring pressed detent adapted to be received in a recess operatively in the vessel for limiting the swinging movement of said upper weight part to positions in all of which the weight is above the vent opening to act as the shield with the center of gravity of the weight at the same side of the axis of swinging of said upper weight part as the vent opening, the detent being yieldable to permit it automatically to be forced out of the recess by cooperation with the lateral walls of the latter when the upper weight part is manually forcibly urged to swing toward a position in which the weight is removed from above the vent opening to place its center of gravity at the opposite side of the axis of swinging of said upper weight part from the vent opening.

8. A pressure vessel presenting an upwardly facing surface and a vent passage operatively opening upward through said surface, a vent valve for said passage adapted to be urged toward open position by steam pressure within the vessel, a weight mounted for upward and downward movement for urging said valve toward closed position in opposition to such steam pressure, the valve and vent passage having cooperating portions for producing an upwardly directed jet of steam from said vent passage when the valve is opened by such steam pressure overcoming the downwardly exerted force of said weight; said weight being formed, on its under side, with a downwardly opening cavity positioned directly above said vent passage for receiving such steam jet, the weight having, outwardly of the opening of said cavity, a downwardly facing surface portion in substantially parallel, relatively closely spaced relation to said upwardly facing surface, which surface portion surrounds said opening and is wide in all directions of its extent outwardly of said opening and is of greater area than that of said opening, said downwardly facing surface portion forming with said upwardly facing surface a chamber with which said opening communicates for flow of steam from said cavity through said chamber in the form of a flat wide jet which discharges from said chamber at its outer edge to produce a partial vacuum in said chamber acting to urge the weight downwardly when the valve is so opened; the cavity having a sufficiently large volume materially to delay the supply to said chamber of steam for forming the last mentioned jet and to accumulate steam for augmenting the force of such jet to such extent as to cause the vacuum produced by said jet to be great enough to pull the weight downwardly and close the valve before the steam pressure in the vessel is reduced to below that which will again open the closed valve, whereby to cause the valve intermittently to open and close when the steam pressure in the vessel reaches such predetermined value as will overcome the downwardly directed force exerted on the valve solely by the action of gravity on the weight.

9. A pressure vessel presenting an upwardly facing surface and a vent passage operatively opening upward through said surface, a vent valve for said passage adapted to be urged toward open position by steam pressure within the vessel, said valve having a downwardly directed conically tapered portion cooperating with said vent passage to open and close the latter, a weight mounted for upward and downward movement for urging said valve toward closed position in opposition to such steam pressure, the conically tapered portion of the valve and the vent passage cooperating to produce an upwardly directed jet of steam from said vent passage when the valve is opened by such steam pressure overcoming the downwardly exerted force of said weight; said weight being formed, on its under side, with a downwardly opening cavity positioned directly above said vent passage for receiving such steam jet, the opening of the cavity on the under side of the weight being substantially circular and substantially coaxial with the vent passage, the lateral surface of said conically tapered portion of said valve if projected upwardly lying within the confines of such opening of said cavity when said portion of said valve cooperates with said vent passage to produce said upwardly directed jet, the weight having, outwardly of the opening of said cavity, a downwardly facing surface portion in substantially parallel, relatively closely spaced relation to said upwardly facing surface, which surface portion surrounds said opening and is wide in all directions of its extent outwardly of said opening and is of greater area than that of said opening, said downwardly facing surface portion forming with said upwardly facing surface a chamber with which said opening communicates for flow of steam from said cavity through said chamber in the form of a flat wide jet which discharges from said chamber at its outer edge to produce a partial vacuum in said chamber acting to urge the weight downwardly when the valve is so opened; the cavity having a sufficiently large volume materially to delay the supply to said chamber of steam for forming the last mentioned jet and to accumulate steam for augmenting the force of such jet to such extent as to cause the vacuum produced by said jet to be great enough to pull the weight downwardly and close the valve before the steam pressure in the vessel is reduced to below that which will again open the closed valve, whereby to cause the valve intermittently to open and close when the steam pressure in the vessel reaches such predetermined value as will overcome the downwardly directed force exerted on the valve solely by the action of gravity on the weight.

10. A pressure vessel according to claim 8 in which the opening of the cavity on the under surface of the weight is circular, and the portion of said cavity immediately adjacent said opening has lateral walls which converge as said portion extends inwardly of the weight.

11. A pressure vessel according to claim 9 in which the valve comprises a stem which is carried by the weight and extends through the cavity to below the under side of the weight, the lower end of said stem being conically tapered, such conically tapered end constituting the downwardly directed conically tapered portion of the valve.

References Cited in the file of this patent

UNITED STATES PATENTS

| Number | Name | Date |
| --- | --- | --- |
| 1,620,719 | Buck | Mar. 15, 1927 |
| 1,638,589 | Louw | Aug. 9, 1927 |
| 2,308,320 | Stephens | Jan. 12, 1943 |
| 2,428,483 | Wittenberg | Oct. 7, 1947 |
| 2,436,566 | Goldberg | Feb. 24, 1948 |
| 2,459,553 | Sullivan | Jan. 18, 1949 |
| 2,538,583 | Morrison | Jan. 16, 1951 |

FOREIGN PATENTS

| Number | Country | Date |
| --- | --- | --- |
| 559,659 | Germany | 1932 |
| 230,049 | Switzerland | Feb. 16, 1944 |
| 243,569 | Switzerland | Jan. 3, 1947 |